(12) United States Patent
Cai

(10) Patent No.: US 10,259,573 B2
(45) Date of Patent: Apr. 16, 2019

(54) COAXIAL TWIN-PROPELLER TWIN-MOTOR AERIAL VEHICLE

(71) Applicant: GoerTek Technology Co., Ltd., Qingdao (CN)

(72) Inventor: Zhongyu Cai, Qingdao (CN)

(73) Assignee: GoerTek Technology Co., Ltd., Qingdao (CN)

(*) Notice: Subject to any disclaimer, the term of this patent is extended or adjusted under 35 U.S.C. 154(b) by 0 days.

(21) Appl. No.: 16/067,604

(22) PCT Filed: Dec. 20, 2016

(86) PCT No.: PCT/CN2016/111146
§ 371 (c)(1),
(2) Date: Jun. 30, 2018

(87) PCT Pub. No.: WO2017/114245
PCT Pub. Date: Jul. 6, 2017

(65) Prior Publication Data
US 2019/0009894 A1    Jan. 10, 2019

(30) Foreign Application Priority Data
Dec. 31, 2015 (CN) .......................... 2015 1 1033226

(51) Int. Cl.
*B64C 27/10* (2006.01)
*B64C 27/14* (2006.01)
(Continued)

(52) U.S. Cl.
CPC ................ *B64C 27/10* (2013.01); *B64C 9/00* (2013.01); *B64C 13/50* (2013.01); *B64C 17/02* (2013.01);
(Continued)

(58) Field of Classification Search
CPC ......... B64C 27/10; B64C 17/02; B64C 27/14; B64C 2201/042; B64C 2201/108
See application file for complete search history.

(56) References Cited

U.S. PATENT DOCUMENTS 2,450,491 A * 10/1948 Solovioff ................ B64C 27/10
416/115
3,053,324 A * 9/1962 Morley .................... B64C 27/18
416/21
(Continued)

FOREIGN PATENT DOCUMENTS

| CA | 2847352 A1 * | 3/2013 | ............. B64C 27/14 |
| CA | 2874341 A1 * | 2/2014 | ............. B64C 29/02 |

(Continued)

OTHER PUBLICATIONS

First Office Action in corresponding Chinese case (and translation).
Written Opinion in corresponding Chinese case (and translation).

*Primary Examiner* — Christopher P Ellis
(74) *Attorney, Agent, or Firm* — Van Dyke Law; Raymond Van Dyke

(57) ABSTRACT

A coaxial twin-propeller twin-motor aerial vehicle comprises an upper propeller (1), a lower propeller (2) and an aerial vehicle body (3). A first motor (4) and a second motor (5) are disposed in the aerial vehicle body (3). The first motor (4) is connected to the lower propeller (2) through a first transmission shaft (42). The second motor (5) is disposed below the first motor (4) and is connected to the upper propeller (1) through a second transmission shaft (52). The second transmission shaft (52) passes through the first motor (4), the first transmission shaft (42), and the lower propeller (2) sequentially and then is connected to the upper propeller (1). The second transmission shaft (52) and the first transmission shaft (42) are coaxial. The upper propeller (1) and the lower propeller (2) rotate at the same speed and in (Continued)

opposite directions under the drive of their individual motors.

10 Claims, 6 Drawing Sheets

(51) Int. Cl.
    *B64C 9/00*                (2006.01)
    *B64D 27/24*            (2006.01)
    *B64D 31/06*            (2006.01)
    *B64C 13/50*            (2006.01)
    *B64C 17/02*            (2006.01)
    *B64C 39/02*            (2006.01)

(52) U.S. Cl.
    CPC .............. *B64C 27/14* (2013.01); *B64D 27/24* (2013.01); *B64D 31/06* (2013.01); *B64C 39/024* (2013.01); *B64C 2201/024* (2013.01); *B64C 2201/042* (2013.01); *B64C 2201/108* (2013.01)

(56) References Cited

U.S. PATENT DOCUMENTS

| | | | | |
|---|---|---|---|---|
| 3,149,803 A | * | 9/1964 | Petrides | B64C 39/022 244/17.13 |
| 3,226,059 A | * | 12/1965 | Paterson | B64C 39/022 244/17.17 |
| 3,570,787 A | * | 3/1971 | Stahmer | B64C 27/12 244/17.23 |
| 3,722,830 A | * | 3/1973 | Barber | B64C 19/00 244/17.23 |
| 4,478,379 A | * | 10/1984 | Kerr | B64C 27/10 244/120 |
| 8,083,173 B2 | * | 12/2011 | Arlton | B64C 39/024 244/17.23 |
| 8,342,440 B2 | * | 1/2013 | Papanikolopoulos | A63H 27/12 244/17.11 |
| 10,054,939 B1 | * | 8/2018 | Applewhite | B64F 1/04 |
| 2014/0091172 A1 | * | 4/2014 | Arlton | B64C 27/14 244/17.23 |
| 2015/0100181 A1 | * | 4/2015 | Strauss | B64D 35/00 701/3 |
| 2016/0001877 A1 | * | 1/2016 | Paulos | B64C 39/028 701/3 |
| 2016/0122012 A1 | * | 5/2016 | Choo | B64C 39/028 244/17.23 |
| 2016/0167778 A1 | * | 6/2016 | Meringer | B64C 27/10 244/17.23 |
| 2017/0320565 A1 | * | 11/2017 | Gamble | B64C 11/28 |
| 2018/0086443 A1 | * | 3/2018 | Bourne | F16H 3/44 |
| 2018/0215482 A1 | * | 8/2018 | Zhang | B64F 1/04 |

FOREIGN PATENT DOCUMENTS

| | | |
|---|---|---|
| CN | 1993264 | 7/2004 |
| CN | 01177167 A | 12/2007 |
| CN | 102556343 | 2/2012 |
| CN | 203127143 | 1/2013 |
| CN | 2014124363 | 10/2014 |
| CN | 105538930 | 12/2015 |
| CN | 205554581 | 12/2015 |
| JP | 1979008877 Y2 | 11/1973 |

* cited by examiner

COAXIAL TWIN-PROPELLER TWIN-MOTOR AERIAL VEHICLE

CROSS REFERENCE TO RELATED APPLICATIONS

The present invention is a nationalization application of International Application No. PCT/CN2016/111146, filed Dec. 20, 2016, based upon an original priority Chinese Patent Application No. 20151103326.2, filed Dec. 31, 2015, the subject matters of which are incorporated by reference herein.

TECHNICAL FIELD

The present disclosure relates to the technical field of aerial vehicle design, and particularly relates to a coaxial twin-propeller twin-motor aerial vehicle.

BACKGROUND ART

Traditional coaxial twin-propeller aerial vehicles can be classified into two types: single-motor driven and twin-motor driven. The motor of the single-motor aerial vehicle must drive two propellers. In the driving process, a transmission component such as gear or belt is often used to change the drive direction of motor so that the propellers rotate in opposite directions at the same rotational speed. A disadvantage of the single-motor aerial vehicle is that its carrying capacity is low, so it is not suitable to carry an extra camera module, and usually a lightweight camera module is in-built inside the aerial vehicle. Since the camera module is directly attached to the aerial vehicle, it is not convenient to replace the camera module.

On the other hand, the carrying capacity of the twin-motor aerial vehicle is higher than that of the single-motor aerial vehicle. The motor layout of the twin-motor aerial vehicle includes two types: a vertical layout and a horizontal layout. The twin-motor aerial vehicle with a horizontal layout must use a transmission component such as gear and belt to drive the upper and lower propellers. A disadvantage of the twin-motor aerial vehicle with a horizontal layout is that it must use a transmission component such as gear and belt to drive the propellers and the transmission components have the problem of being worn and aging.

On the other hand, the twin-motor aerial vehicle with a vertical layout needs a wiring rack installed outside the propeller, and the wires run between the motor and the propeller with the aid of the wiring rack. A disadvantage of the twin-motor aerial vehicle with a vertical layout is that the wiring is difficult and it needs additional installation of a wiring rack, which results in the increase of the weight of aerial vehicle.

SUMMARY OF THE DISCLOSURE

In view of the above problems, the present disclosure provides a coaxial twin-propeller twin-motor aerial vehicle to solve or partially solve these problems.

To achieve the object, the technical solutions of the present disclosure are as follows.

The present disclosure provides a coaxial twin-propeller twin-motor aerial vehicle, comprising an upper propeller 1, a lower propeller 2 and an aerial vehicle body 3, wherein the upper propeller 1 and the lower propeller 2 are disposed at the end of the aerial vehicle body 3, the upper propeller 1 is located above the lower propeller 2, and a first motor 4 and a second motor 5 are provided inside the aerial vehicle body 3;

the first motor 4 is connected to the lower propeller 2 through a first transmission shaft 42;

the second motor 5 is located below the first motor 4 and is connected to the upper propeller 1 through a second transmission shaft 52, the second transmission shaft 52 passes through the first motor 4, the first transmission shaft 42 and the lower propeller 2 sequentially and then is connected to the upper propeller 1;

the second transmission shaft 52 and the first transmission shaft 42 are coaxial; and the upper propeller 1 and the lower propeller 2 rotate at the same speed and in opposite directions under the drive of their individual motors.

Preferably, the first motor 4 is fixed in the aerial vehicle body 3 through a first fixing base 41, and the second motor 5 is fixed in the aerial vehicle body 3 through a second fixing base 51.

Preferably, the first motor 4 is an outer rotor motor, and the second motor 5 is an inner rotor motor.

Preferably, the coaxial twin-propeller twin-motor aerial vehicle further comprises a wing drive unit 6 constituting part of the aerial vehicle body 3;

a ring-shaped wing 7 extending out of the wing drive unit 6 is provided at a central position of the wing drive unit 6, and the ring-shaped wing 7 is movable horizontally under the drive of the wing drive unit 6;

when drag areas of the ring-shaped wing 7 extending out of an outer circumference of the wing drive unit 6 are the same in all directions, the aerial vehicle maintains its current flying posture; and when the ring-shaped wing 7 moves toward a certain direction to increase the drag area extending out of the wing drive unit 6 in the certain direction, and contracts into the wing drive unit 6 in its opposite direction to reduce the drag area in the opposite direction, the aerial vehicle changes its current flight posture.

More preferably, the wing drive unit 6 comprises a cylindrical magnetic ring 61, an electromagnetic motor 62, an upper cover 63 and a lower cover 64, and the ring-shaped wing 7 and the outer wall of the cylindrical magnetic ring 61 are integrally formed;

the cylindrical magnetic ring 61 is sleeved on the outer periphery of the electromagnetic motor 62, and they have a same height and are separated by a certain annular distance;

the electromagnetic motor 62 is fixed between the upper cover 63 and the lower cover 64, a space is reserved between the upper cover 63 and the lower cover 64 through which the ring-shaped wing 7 extends outward, and part of the ring-shaped wing 7 extends outside the aerial vehicle body 3 through the space formed by the upper cover 63 and the lower cover 64;

when the current flying posture is maintained, the magnetic field of the electromagnetic motor 62 is uniformly distributed and repels the polarity of the cylindrical magnetic ring 61, and the axial center of the cylindrical magnetic ring 61 coincides with the axial center of the electromagnetic motor 62; and when the current flying posture is to be changed, the operating current flowing in the electromagnetic motor 62 in a certain direction is changed to change the magnetic field of the electromagnetic motor 62, and the axial center of the cylindrical magnetic ring 61 shifts under the action of the magnetic field of the electromagnetic motor 62 and the ring-shaped wing 7 is driven to move horizontally.

More preferably, the upper cover 63 and the lower cover 64 have a same structure and both comprise a screw base 65 located at a central position and supporting columns 66 located around the screw base 65; and both ends of the electromagnetic motor 62 have a screw head 621 fitting with the screw base 65, and the upper cover 63 and the lower cover 64 are tightly fixed by the fitting of the screw head 621 at both ends of the electromagnetic motor 62 and the screw base 65.

More preferably, the aerial vehicle body 3 comprises a nose 31, a fuselage 32 and a tail 33, and the fuselage 32 is located between the nose 31 and the tail 33; and the first motor 4 and the second motor 5 are both disposed inside the nose 31, and the wing drive unit 6 is disposed between the nose 31 and the fuselage 32;

or, the first motor 4 is disposed inside the nose 31, the second motor 5 is disposed inside the fuselage 32, and the wing drive unit 6 is disposed between the fuselage 32 and the tail 33.

More preferably, a main control circuit board 321, a battery 322 and a third fixing base 323 are disposed in the fuselage 32;

the main control circuit board 321 and the battery 322 are disposed in the fuselage 32 through the third fixing base 323, the battery 322 is disposed at the upper side of the third fixing base 323, and the main control circuit board 321 is tightly fixed at the lower side of the third fixing base 323;

the main control circuit board 321 is configured to control the flight of the aerial vehicle; and the battery 322 is configured to supply power to the main control circuit board 321, the first motor 4 and the second motor 5.

More preferably, a distance measuring sensor 331 and a sensor fixing base 332 for fixing the distance measuring sensor 331 in the tail 33 are disposed in the tail 33;

the distance measuring sensor 321 is connected to the main control circuit board 321 through a flexible circuit board, and is configured to measure the real-time flying height of the aerial vehicle and send measured flying height information to the main control circuit board 321; and the main control circuit board 321 is configured to control the rotational speeds of the first motor 4 and the second motor 5 according to received flying height information.

Preferably, the coaxial twin-propeller twin-motor aerial vehicle further comprises a balance rod 8 and a support frame 9;

the balance rod 8 is located at the front end of the upper propeller 1, and is configured to maintain the stability of the aerial vehicle when it hovers in the air; and the support frame 9 is disposed outside of the tail 33 and is configured to carry a carrier 10.

The advantageous effects of the present disclosure are as follows.

First, the first motor and the second motor are vertically distributed in the aerial vehicle body, the first motor directly drives the lower propeller through its transmission shaft, and the second motor directly drives the upper propeller through its transmission shaft, so a transmission component such as gear and belt is not needed to change the driving direction. Therefore, the assembling of the components can be simplified, the wear and loss caused by the aging of the components can be avoided, and the production cost can be reduced.

Second, since the first motor and the second motor are vertically distributed in the aerial vehicle body, circuit wires can run inside the aerial vehicle body, and an extra outer wiring rack is not needed, thereby further simplifying the components and reducing the size of the aerial vehicle.

Third, the aerial vehicle of the present disclosure, as a whole, is composed of only the upper and lower propellers and the streamlined aerial vehicle body. Its structure is simple, and the weight of the aerial vehicle itself can be reduced. Moreover, the design of the streamlined body without an empennage can reduce the drag, and thus can ease the restrictions on the weight of the camera module carried thereon.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

Figure 1:
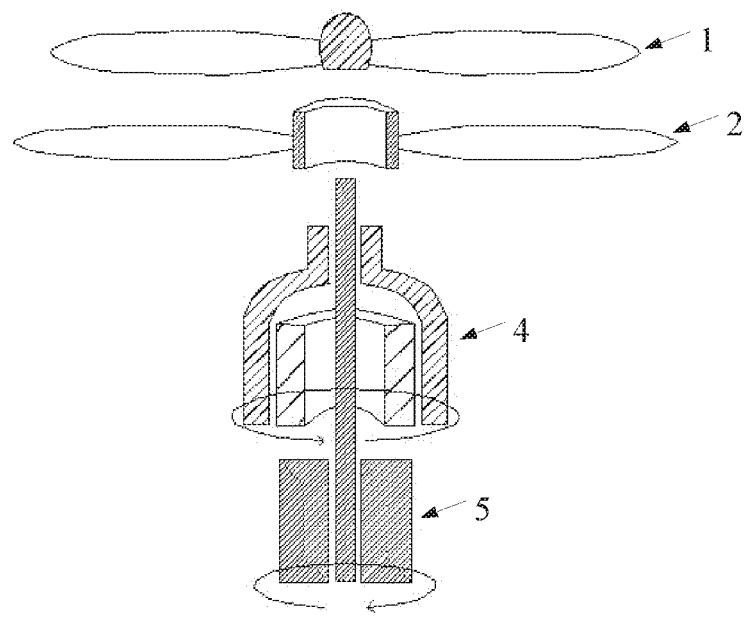
FIG. 1 is a schematic diagram of the principle of driving upper and lower propellers in an aerial vehicle according to the present disclosure.

In the drawings, 1: upper propeller; 2: lower propeller; 3: aerial vehicle body; 31: nose; 32: fuselage; 321: main control circuit board; 322: battery; 323: third fixing base; 33: tail; 331: distance measuring sensor; 332: sensor fixing base; 4: first motor; 41: first fixing base; 42: first transmission shaft; 5: second motor; 51: second fixing base; 52: second transmission shaft; 6: wing drive unit; 61: cylindrical magnetic ring; 62: electromagnetic motor; 621: screw head; 63:

upper cover; 64: lower cover; 65: screw base; 66: supporting column; 7: ring-shaped wing; 8: balance rod; 9: support frame; 10: carrier.

DETAILED DESCRIPTION

The present invention will now be described more fully hereinafter with reference to the accompanying DRAWINGS, in which preferred embodiments of the invention are shown. It is, of course, understood that this invention may, however, be embodied in many different forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized, and structural changes can be made without departing from the scope of the present invention.

In order to make the objects, technical solutions and advantages of the present disclosure clearer, the embodiments of the present disclosure will be described below in further detail in conjunction with the drawings.

The general inventive concept of the coaxial twin-propeller twin-motor aerial vehicle of the present disclosure is as follows. As shown in FIG. 1, the first motor and the second motor of the aerial vehicle are vertically distributed, the first motor is directly connected to the lower propeller through the transmission shaft thereof, and the transmission shaft of the second motor sequentially passes through the first motor and the transmission shaft of the outer rotor and then is directly connected to the upper propeller. The second motor drives the upper propeller, the outer rotor drives the upper propeller, so that the upper and lower propellers rotate at the same speed and in different directions to offset the forces, and thus the aerial vehicle body will not be driven to rotate.

Figure 2:
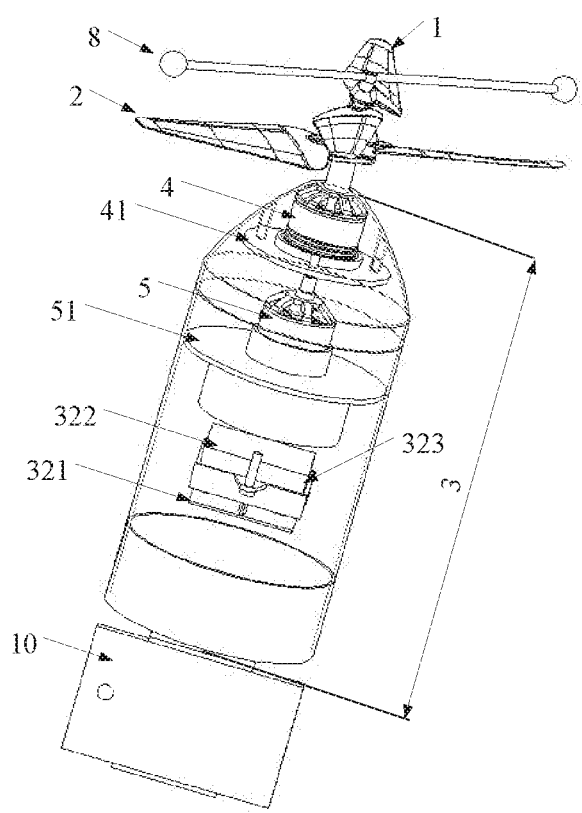
FIG. 2 is a perspective view of an aerial vehicle according to an embodiment of the present disclosure.
Figure 3:
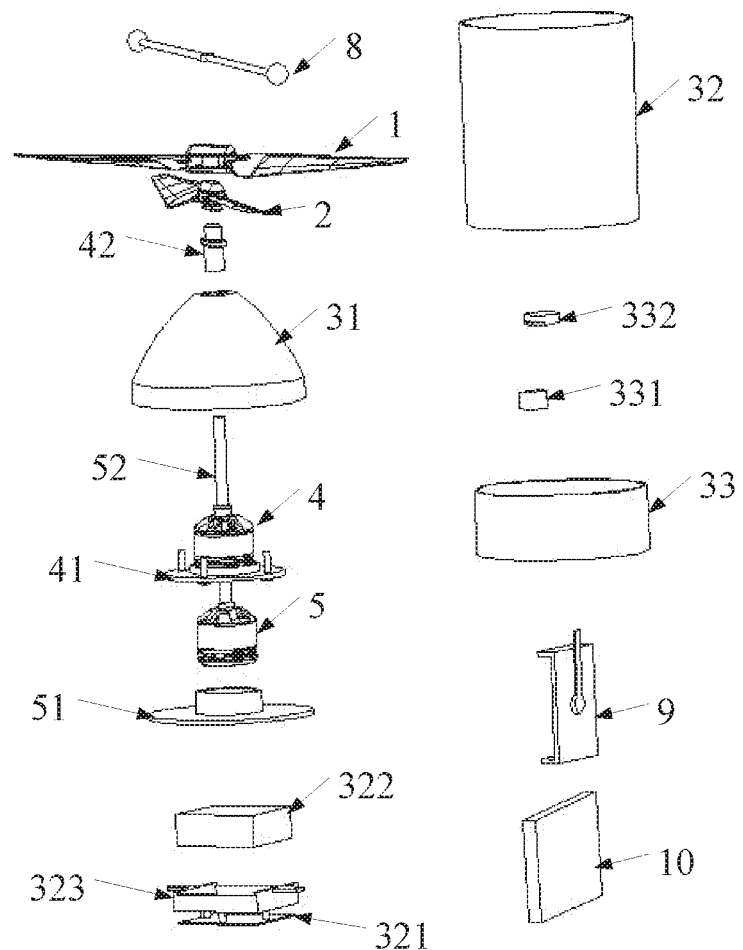
FIG. 3 is an exploded view of the aerial vehicle in FIG. 2.

FIG. 2 is a perspective view of the aerial vehicle according to the present embodiment, and FIG. 3 is an exploded view of the aerial vehicle in FIG. 2.

As jointly shown in FIGS. 2 and 3, the aerial vehicle comprises an upper propeller 1, a lower propeller 2 and an aerial vehicle body 3. The upper propeller 1 and the lower propeller 2 are disposed at the end of the aerial vehicle body 3, and the upper propeller 1 is located above the lower propeller 2. The aerial vehicle body 3 has a streamlined shape, and a first motor 4 and a second motor 5 vertically distributed are disposed inside the aerial vehicle. The first motor 4 is fixed in the aerial vehicle body 3 through a first fixing base 41, and the second motor 5 is fixed in the aerial vehicle body 3 through a second fixing base 51. Preferably, the first motor 4 is an outer rotor motor, and the second motor 5 is an inner rotor motor.

As shown in FIG. 3, the first motor 4 is connected to the lower propeller 2 through a first transmission shaft 42.

The second motor 5 is located below the first motor 4, and the second transmission shaft 52 of the second motor 5 passes through the first fixing base 41, the first motor 4, the second transmission shaft 42 and the lower propeller 2 sequentially and then is connected to the upper propeller 1.

The second transmission shaft 52 and the first transmission shaft 42 are coaxial. The upper propeller 1 and the lower propeller 2 rotate at the same speed and in opposite directions under the drive of their individual motors.

The aerial vehicle of the present embodiment adopts a design of twin-propeller and twin-motor, in which the first motor and the second motor are vertically distributed in the aerial vehicle body, the first motor directly drives the lower propeller through its transmission shaft, and the second motor directly drives the upper propeller through its transmission shaft, so that the upper and lower propellers rotate at the same rotational speed and in different directions to offset the forces, and thus the aerial vehicle body will not be driven to rotate. Compared with traditional twin-motor aerial vehicles, the aerial vehicle of the present embodiment does not need to change the driving direction by means of a transmission component such as gear and belt, thus simplifying the assembling of the components, avoiding the wear and loss caused by the aging of the components, and reducing the production cost. Moreover, in the present embodiment, since the first motor and the second motor are vertically distributed in the aerial vehicle body, circuit wires can run inside the aerial vehicle body, and an extra outer wiring rack is not needed, thereby further simplifying the components and reducing the size of the aerial vehicle.

The carrying capacity of the coaxial twin-propeller twin-motor aerial vehicle of the present embodiment is higher than that of single-motor aerial vehicles. Moreover, compared with traditional twin-motor aerial vehicles, the coaxial twin-propeller twin-motor aerial vehicle of the present embodiment has a simple structure and can reduce the weight of the aerial vehicle itself, and thus easing the restrictions on the weight of the camera module carried thereon. The design of streamlined body can also reduce the drag and improve the aerial vehicle performance.

In one implementation of the present embodiment, by taking advantage of the principle of changing the drag by the wing, a wing drive unit is introduced in the aerial vehicle body. Under normal circumstances, drag areas of the parts of the wing extending out of the aerial vehicle body are the same in all directions, so although the wing produces drag, the downward pushing force of the aerial vehicle is uniform and the aerial vehicle can maintain the current flying posture since drag areas are small and equal. When the wing moves toward a certain direction, it will contract into the aerial vehicle body in the opposite direction, the drag area extending out of the aerial vehicle body in the certain direction is relatively increased, thus the downward pushing force of the aerial vehicle becomes uneven, and then the fuselage angle changes, which can change the current flight posture.

As shown in FIGS. 5 to 8, the aerial vehicle further comprises a wing drive unit 6 constituting part of the aerial vehicle body 3.

A ring-shaped wing 7 extending out of the wing drive unit 6 is provided at the central position of the wing drive unit 6. The ring-shaped wing 7 is movable horizontally under the drive of the wing drive unit 6.

When drag areas of the ring-shaped wing 7 extending out of an outer circumference of the wing drive unit 6 are the same in all directions, the aerial vehicle maintains the current flying posture.

When the ring-shaped wing 7 moves toward a certain direction to increase the drag area extending out of the wing drive unit 6 in the certain direction, and contracts into the wing drive unit 6 in the opposite direction to reduce the drag area in the opposite direction, the aerial vehicle changes its current flight posture.

Figure 6:
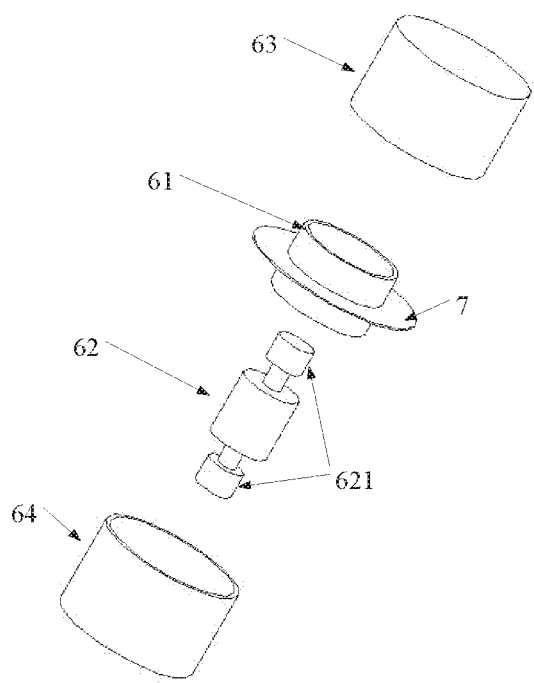
FIG. 6 is an exploded view of the wing drive unit of the aerial vehicle in FIG. 5.

As shown in FIG. 6, the wing drive unit 6 comprises a cylindrical magnetic ring 61, an electromagnetic motor 62, an upper cover 63 and a lower cover 64. The ring-shaped wing 7 and the outer wall of the cylindrical magnetic ring 61 are integrally formed.

The cylindrical magnetic ring 61 is sleeved on the outer periphery of the electromagnetic motor 62, and they have the same height and are separated by a certain annular distance.

The electromagnetic motor 62 is fixed between the upper cover 63 and the lower cover 64, and a space is reserved between the upper cover 63 and the lower cover 64 through which the ring-shaped wing 7 extends outward. Part of the ring-shaped wing 7 extends outside the aerial vehicle body 3 through the space formed by the upper cover 63 and the lower cover 64.

Figure 9A:
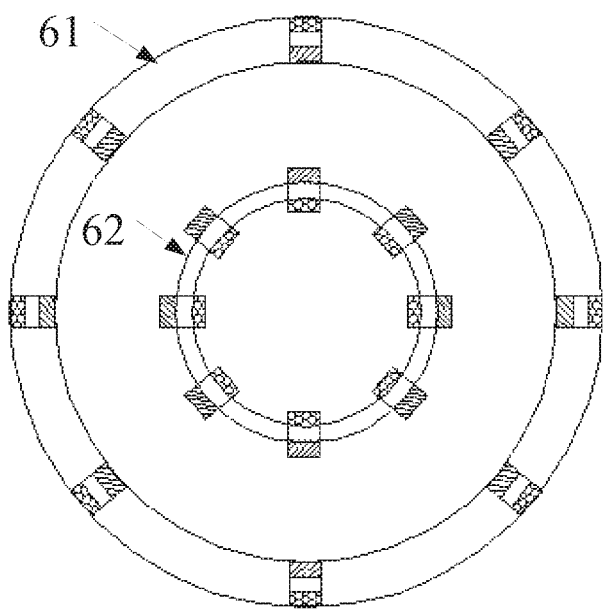
FIG. 9a is a schematic diagram of the magnetic field of an electromagnetic motor when the axial center of a cylindrical magnetic ring of the wing drive unit in FIG. 6 is shifted leftward with respect to the electromagnetic motor.
Figure 10A:
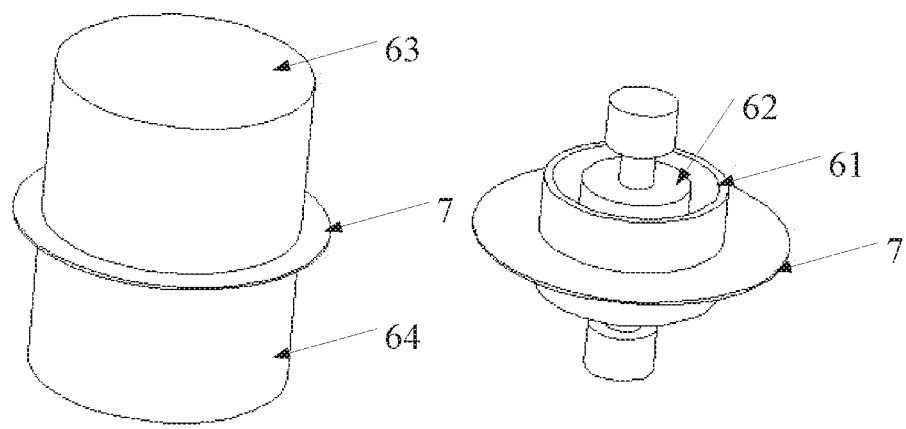
FIG. 10a is a schematic diagram of the drag area of a ring-shaped wing when the axial center of the cylindrical magnetic ring and the axial center of the electromagnetic motor coincide with each other according to an embodiment.

When the current flying posture is maintained, the magnetic field of the electromagnetic motor 62 is uniformly distributed and repels the polarity of the cylindrical magnetic ring 61, and the axial center of the cylindrical magnetic ring 61 coincides with the axial center of the electromagnetic motor 62. As shown in FIG. 9a, when the electromagnetic motor 62 operates in the normal way, the outer surface of the electromagnetic motor 62 and the inner surface of the cylindrical magnetic ring 61 have the same magnetism. Since the magnetic fields of the cylindrical magnetic ring 61 and the electromagnetic motor 62 are distributed uniformly, the repulsive forces applied on the cylindrical magnetic ring 61 are the same in all directions, so that its axial center coincides with the axial center of the electromagnetic motor 62. As shown in FIG. 10a, when the axial center of the cylindrical magnetic ring 61 coincides with the axial center of the electromagnetic motor 62, drag areas of the parts of the ring-shaped wing 7 extending out of the aerial vehicle body 3 are the same in all directions, and the downward pushing force of the aerial vehicle is uniform, thus the aerial vehicle can maintain its current flying posture.

Figure 9B:
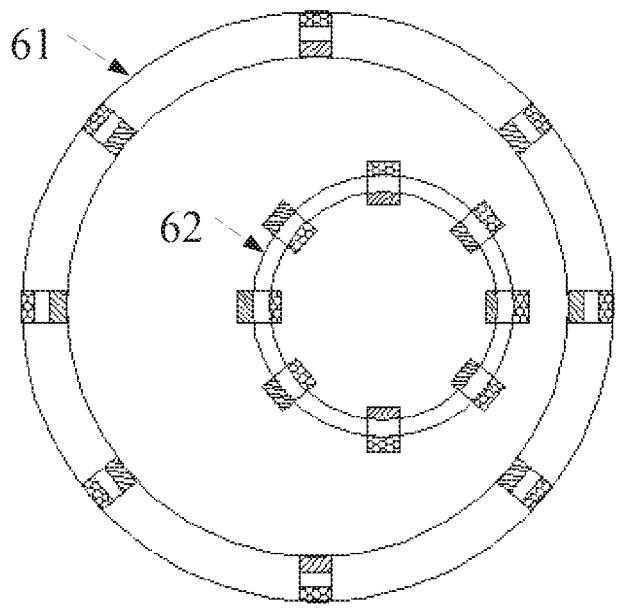
FIG. 9b is a schematic diagram of the magnetic field of the electromagnetic motor when the axial center of the cylindrical magnetic ring of the wing drive unit in FIG. 6 is shifted leftward with respect to the electromagnetic motor.
Figure 10B:
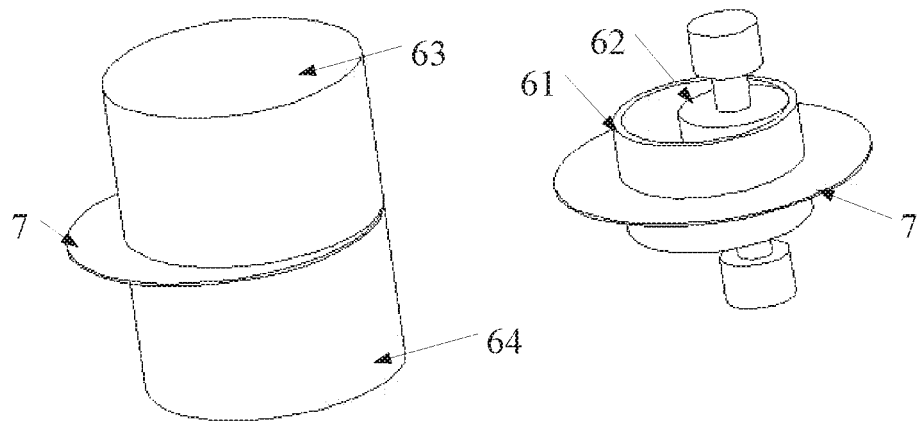
FIG. 10b is a schematic diagram of the drag area of the ring-shaped wing when the axial center of the cylindrical magnetic ring is shifted leftward with respect to the electromagnetic motor according to an embodiment.

When the current flying posture is to be changed, the operating current flowing in the electromagnetic motor 62 in a certain direction is changed to change the magnetic field of the electromagnetic motor 62. The axial center of the cylindrical magnetic ring 61 shifts under the action of the magnetic field of the electromagnetic motor 62, and the ring-shaped wing 7 is driven to move horizontally. As shown in FIG. 9b, if the ring-shaped wing 7 is to be driven to move leftward, the direction of the operating current on the right side of the electromagnetic motor 62 may be changed to change the magnetic polarity on the right side of the electromagnetic motor 62, and the axial center of the cylindrical magnetic ring 3 is attracted to move leftward. As shown in FIG. 10b, when the axial center of the cylindrical magnetic ring 61 is shifted leftward with respect to the axial center of the electromagnetic motor 62, the drag area of the ring-shaped wing 7 extending out of the left side of the aerial vehicle body 3 increases relatively, a leftward drag generates on the aerial vehicle, and the aerial vehicle body of the aerial vehicle is shifted leftward so that the aerial vehicle can change the current flying posture.

Figure 10C:
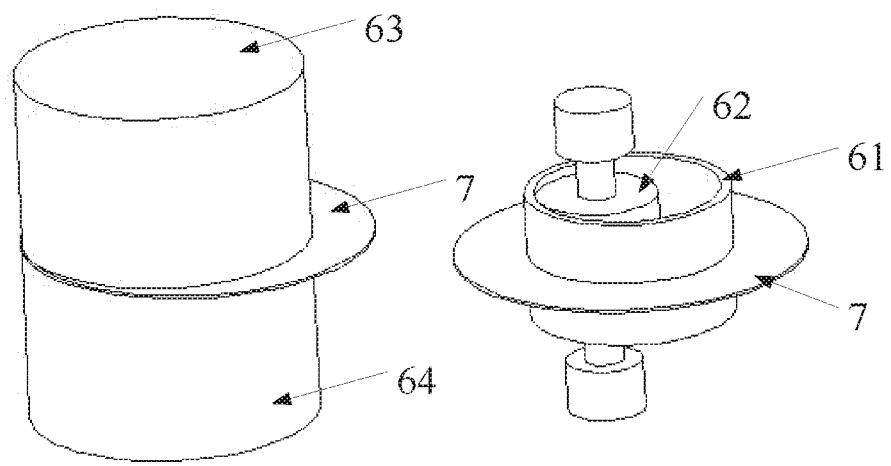
FIG. 10c is a schematic diagram of the drag area of the ring-shaped wing when the axial center of the cylindrical magnetic ring is shifted rightward with respect to the electromagnetic motor according to an embodiment.

When the aerial vehicle body of the aerial vehicle needs to shift rightward, the direction of the operating current on the left side of the electromagnetic motor 62 may be changed to change the magnetic polarity on the left side of the electromagnetic motor 62 to attract the axial center of the cylindrical magnetic ring 3 to move rightward. As shown in FIG. 10c, when the axial center of the cylindrical magnetic ring 61 is shifted rightward with respect to the axial center of the electromagnetic motor 62, the drag area of the ring-shaped wing 7 extending out of the right side of the aerial vehicle body 3 increases relatively, a rightward drag generates on the aerial vehicle, and the aerial vehicle body is shifted rightward.

Figure 7:
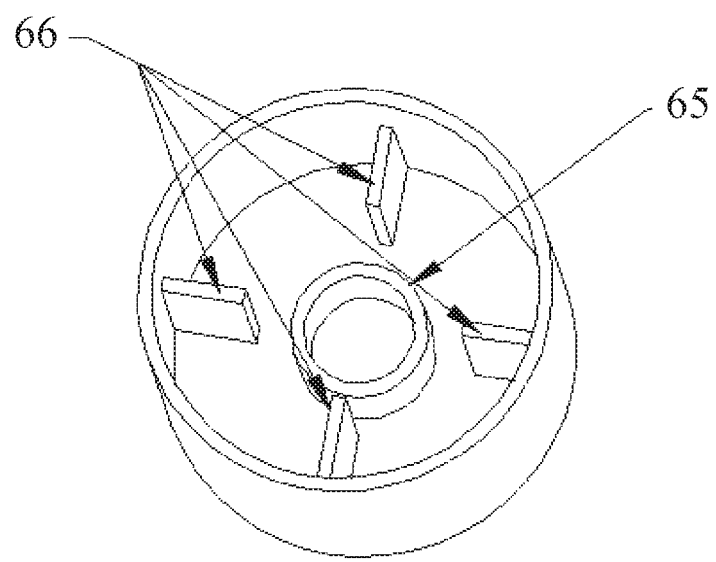
FIG. 7 is a schematic diagram of the structure of an upper cover of the wing drive unit in FIG. 5.
Figure 8:
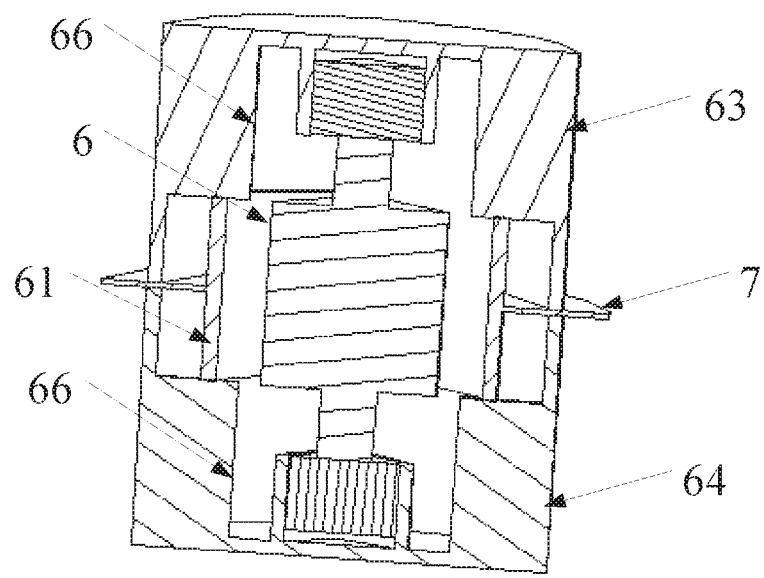
FIG. 8 is a schematic sectional view of the wing drive unit in FIG. 5.

The upper cover 63 and the lower cover 64 have the same structure. As shown in FIG. 7, the upper cover 63 and the lower cover 64 both include a screw base 65 located at a central position and supporting columns 66 located around the screw base 65.

As shown in FIG. 6, both ends of the electromagnetic motor 62 have a screw head 621 fitting with the screw base 65. The upper cover 63 and the lower cover 64 are tightly fixed by the fitting of the screw head 621 at both ends of the electromagnetic motor 62 and the screw base 65. The supporting columns 66 of the upper cover 63 and the lower cover 64 limits the cylindrical magnetic ring 61 vertically to prevent the cylindrical magnetic ring 61 from moving up and down.

In another implementation of the present embodiment, the aerial vehicle body 3 comprises a nose 31, a fuselage 32 and a tail 33, and the fuselage 32 is located between the nose 31 and the tail 33.

Figure 5:
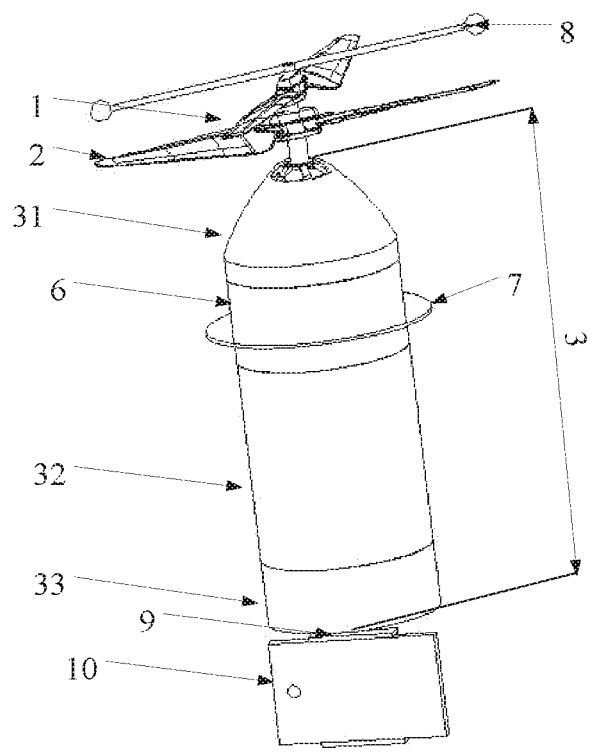
FIG. 5 is a schematic diagram of the appearance of an aerial vehicle having a wing drive unit according to an embodiment of the present disclosure.

In the present disclosure, the wing drive unit may be disposed between the nose and the fuselage or between the fuselage and the tail. As shown in FIG. 5, when the first motor 4 and the second motor 5 are both disposed inside the nose 31, the wing drive unit 6 is preferably disposed between the nose 31 and the fuselage 32. Technically speaking, the second motor may also be disposed in the fuselage, so when the first motor 4 is disposed inside the nose 31 and the second motor 5 is disposed inside the fuselage 32, the wing drive unit 6 is preferably disposed between the fuselage 32 and the tail 33.

As jointly shown in FIGS. 2 and 3, a main control circuit board 321, a battery 322 and a third fixing base 323 are disposed in the fuselage 32.

The main control circuit board 321 and the battery 322 are disposed in the fuselage 32 through the third fixing base 323. The battery 322 is disposed at the upper side of the third fixing base 323. The main control circuit board 321 is tightly fixed at the lower side of the third fixing base 323.

The main control circuit board 321 is configured to control the flight of the aerial vehicle.

The battery 322 is configured to supply power to the main control circuit board 321, the first motor 4 and the second motor 5.

Figure 4:
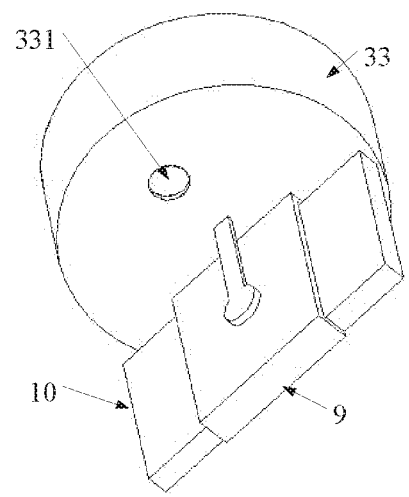
FIG. 4 is a schematic diagram of a distance measuring sensor of the aerial vehicle in FIG. 2.

As shown in FIG. 4, a distance measuring sensor 331 and a sensor fixing base 332 for fixing the distance measuring sensor 331 in the tail 33 are disposed in the tail 33.

The distance measuring sensor 331 is connected to the main control circuit board 321 through a flexible circuit board, and is configured to measure the real-time flying height of the aerial vehicle and send the measured flying height information to the main control circuit board 321.

The main control circuit board 321 is configured to control the rotational speeds of the first motor 4 and the second motor 5 according to the received flying height information.

As jointly shown in FIGS. 2 and 3, the aerial vehicle of the present embodiment further comprises a balance rod 8 and a support frame 9. The balance rod 8 is located at the front end of the upper propeller 1, and is configured to maintain the stability of the aerial vehicle when it hovers in the air. The support frame 9 is disposed at the rear end and outside of the tail 33 and is configured to carry a carrier 10. The carrier 10 may be a device such as a mobile phone and a PAD.

To sum up, the present disclosure provides a coaxial twin-propeller twin-motor aerial vehicle having the following advantageous effects:

First, the first motor and the second motor are vertically distributed in the aerial vehicle body, the first motor directly drives the lower propeller through its transmission shaft, and the second motor directly drives the upper propeller through its transmission shaft, so a transmission component such as gear and belt is not needed to change the driving direction.

Therefore, the assembling of the components can be simplified, the wear and loss caused by the aging of the components can be avoided, and the production cost can be reduced.

Second, since the first motor and the second motor are vertically distributed in the aerial vehicle body, circuit wires can run inside the aerial vehicle body, and an extra outer wiring rack is not needed, thereby further simplifying the components and reducing the size of the aerial vehicle.

Third, the aerial vehicle of the present disclosure, as a whole, is composed of only the upper and lower propellers and the streamlined aerial vehicle body. Its structure is simple, and the weight of the aerial vehicle itself can be reduced. Moreover, the design of the streamlined body without an empennage can reduce the drag, and thus can ease the restrictions on the weight of the camera module carried thereon.

The above description is merely preferable embodiments of the present disclosure, and is not intended to limit the protection scope of the present disclosure. Any modification, equivalent substitution, improvement, etc. made within the spirit and principle of the present disclosure shall be included in the protection scope of the present disclosure.

What is claimed is:

1. A coaxial twin-propeller twin-motor aerial vehicle, comprising:
   an upper propeller,
   a lower propeller, and
   an aerial vehicle body,
   wherein the upper propeller and the lower propeller are disposed at the end of the aerial vehicle body, the upper propeller is located above the lower propeller, and a first motor and a second motor are provided inside the aerial vehicle body,
   the first motor is connected to the lower propeller through a first transmission shaft;
   the second motor is located below the first motor and is connected to the upper propeller through a second transmission shaft, and the second transmission shaft passes through the first motor, the first transmission shaft and the lower propeller sequentially and then is connected to the upper propeller;
   the second transmission shaft and the first transmission shaft are coaxial; and
   the upper propeller and the lower propeller rotate at the same speed and in opposite directions under the drive of their individual motors;
   wherein the coaxial twin-propeller twin-motor aerial vehicle further comprise a wing drive unit constituting part of the aerial vehicle body;
   a ring-shaped wing extending out of the wing drive unit is provided at a central position of the wing drive unit, and the ring-shaped wing is movable horizontally under the drive of the wing drive unit;
   wherein, when drag areas of the ring-shaped wing extending out of an outer circumference of the wing drive unit are the same in all directions, the aerial vehicle maintains a current flying posture; and
   wherein, when the ring-shaped wing moves toward a certain direction to increase the drag area extending out of the wing drive unit in the certain direction, and contracts into the wing drive unit in an opposite direction to reduce the drag area in the opposite direction, the aerial vehicle changes said current flight posture.

2. The coaxial twin-propeller twin-motor aerial vehicle according to claim 1, wherein the first motor is fixed in the aerial vehicle body through a first fixing base, and the second motor is fixed in the aerial vehicle body through a second fixing base (51).

3. The coaxial twin-propeller twin-motor aerial vehicle according to claim 1, wherein the first motor is an outer rotor motor, and the second motor is an inner rotor motor.

4. The coaxial twin-propeller twin-motor aerial vehicle according to claim 1, wherein the wing drive unit comprises a cylindrical magnetic ring, an electromagnetic motor, an upper cover and a lower cover, and
   wherein the ring-shaped wing and an outer wall of the cylindrical magnetic ring are integrally formed;
   wherein the cylindrical magnetic ring is sleeved e around an outer periphery of the electromagnetic motor, and wherein said cylindrical magnetic ring and said electromagnetic motor have substantially the same height and wherein said cylindrical magnetic ring has an annular diameter greater than said electromagnetic motor;
   wherein the electromagnetic motor is fixed between the upper cover and the lower cover, and having a space between the upper cover and the lower cover through which the ring-shaped wing extends outward, and part of the ring-shaped wing extends outside the aerial vehicle body through the space formed by the upper cover and the lower cover;
   wherein, when the current flying posture is maintained, a magnetic field of the electromagnetic motor is uniformly distributed and repels the polarity of the cylindrical magnetic ring and an axial center of the cylindrical magnetic ring coincides with an axial center of the electromagnetic motor; and
   wherein, when the current flying posture is to be changed, an operating current flowing in the electromagnetic motor in one direction is changed to change the magnetic field of the electromagnetic motor, and the axial center of the cylindrical magnetic ring shifts under the action of the magnetic field of the electromagnetic motor and the ring-shaped wing is driven to move horizontally.

5. The coaxial twin-propeller twin-motor aerial vehicle according to claim 4, wherein the upper cover and the lower cover are substantially identical in structure and both comprise a screw base located at a central position and supporting columns located around the screw base; and
   wherein both ends of the electromagnetic motor have a screw head fitting with the screw base, and the upper cover and the lower cover are tightly fixed by the fitting of the screw head at both ends of the electromagnetic motor and the screw base.

6. The coaxial twin-propeller twin-motor aerial vehicle according to claim 1, wherein the aerial vehicle body comprises a nose, a fuselage and a tail,
   wherein the fuselage is located between the nose (31) and the tail; and
   wherein the first motor and the second motor are both disposed inside the nose, and the wing drive unit is disposed between the nose and the fuselage.

7. The coaxial twin-propeller twin-motor aerial vehicle according to claim 6, wherein a main control circuit board, a battery and a third fixing base are disposed in the fuselage;
   wherein the main control circuit board and the battery are disposed in the fuselage through the third fixing base, the battery is disposed at an upper side of the third fixing base, and the main control circuit board is fixed at a lower side of the third fixing base;

wherein the main control circuit board is configured to control the flight of the aerial vehicle; and wherein the battery is configured to supply power to the main control circuit board, the first motor and the second motor.

8. The coaxial twin-propeller twin-motor aerial vehicle according to claim 7, wherein a distance measuring sensor and a sensor fixing base for fixing the distance measuring sensor in the tail are disposed in the tail;

wherein the distance measuring sensor is connected to the main control circuit board, and is configured to measure a real-time flying height of the aerial vehicle, and send measured flying height information to the main control circuit board; and wherein the main control circuit board is configured to control the rotational speeds of the first motor and the second motor according to received flying height information.

9. The coaxial twin-propeller twin-motor aerial vehicle according to claim 6, further comprising:

a balance rod and a support frame;

wherein the balance rod is located at the front end of the upper propeller, and is configured to maintain the stability of the aerial vehicle when it hovers in the air; and wherein the support frame is disposed outside of the tail and is configured to carry a carrier.

10. The coaxial twin-propeller twin-motor aerial vehicle according to claim 1, wherein the aerial vehicle body comprises a nose, a fuselage and a tail, wherein the first motor is disposed inside the nose, the second motor is disposed inside the fuselage, and the wing drive unit is disposed between the fuselage and the tail.

* * * * *